Nov. 8, 1955
C. H. GARMAGER
2,722,873
TRACTOR HYDRAULIC SYSTEM
Filed July 9, 1951
5 Sheets-Sheet 1
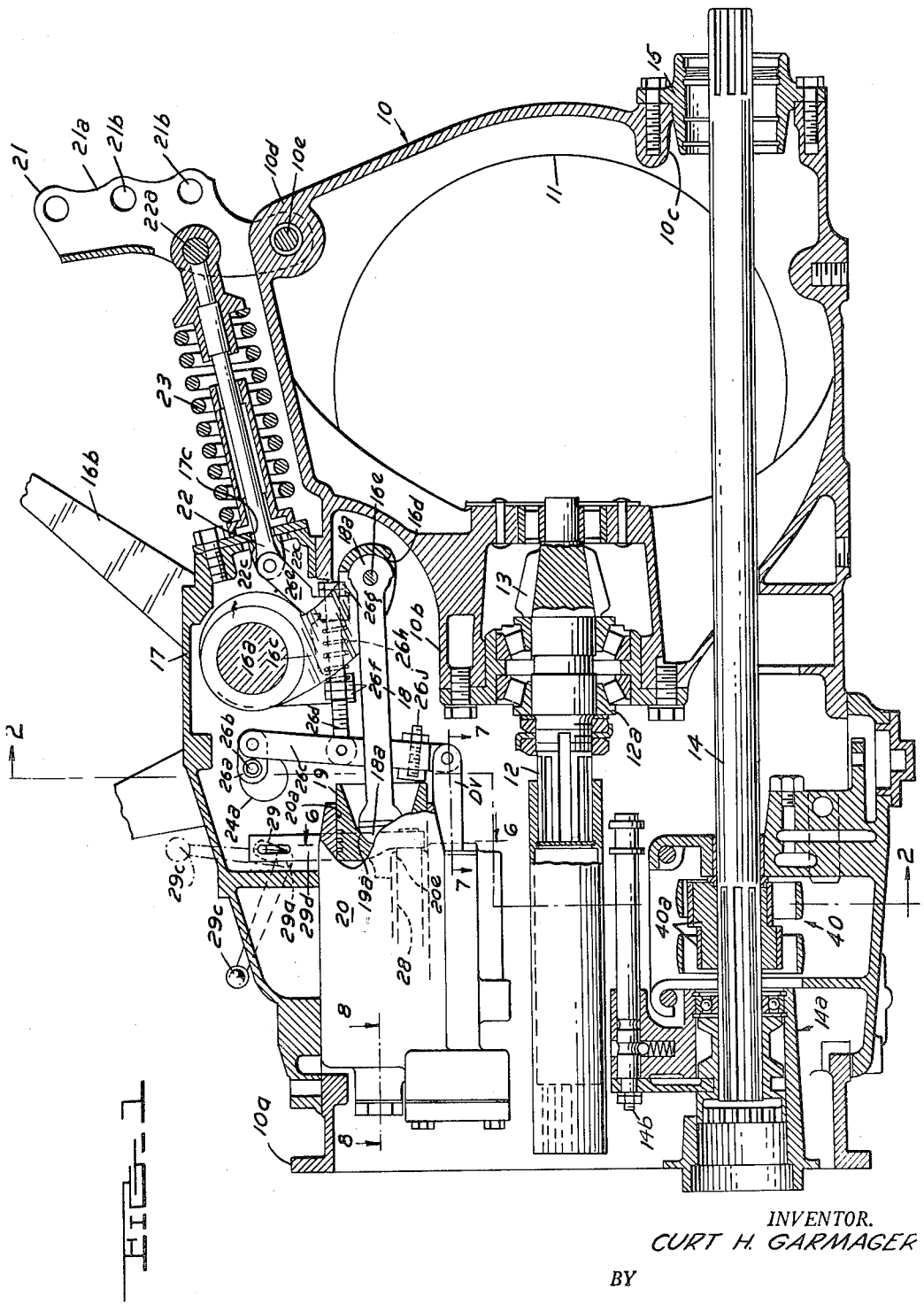
INVENTOR.
CURT H. GARMAGER
BY
W. A. Schaich
ATTORNEY

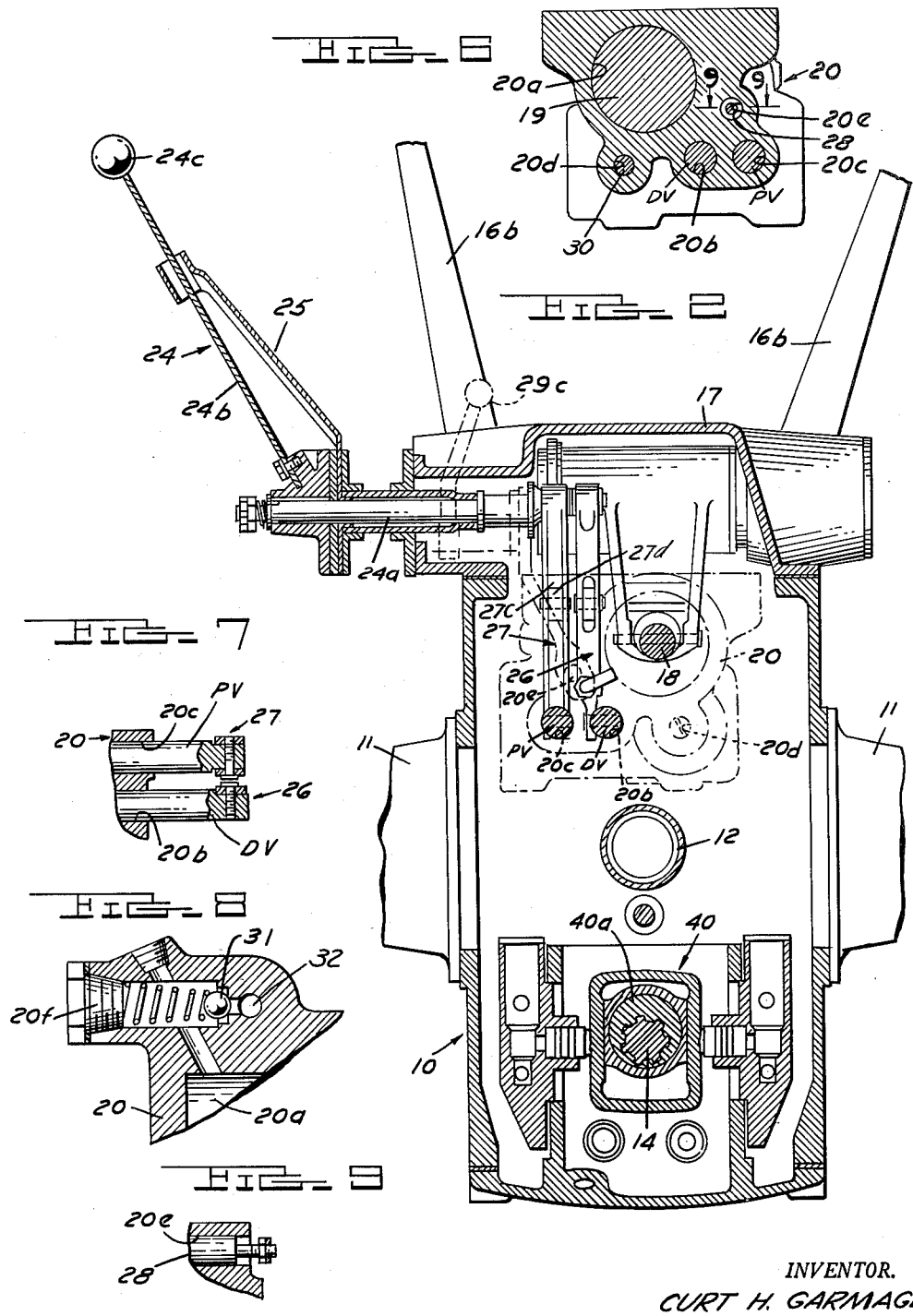

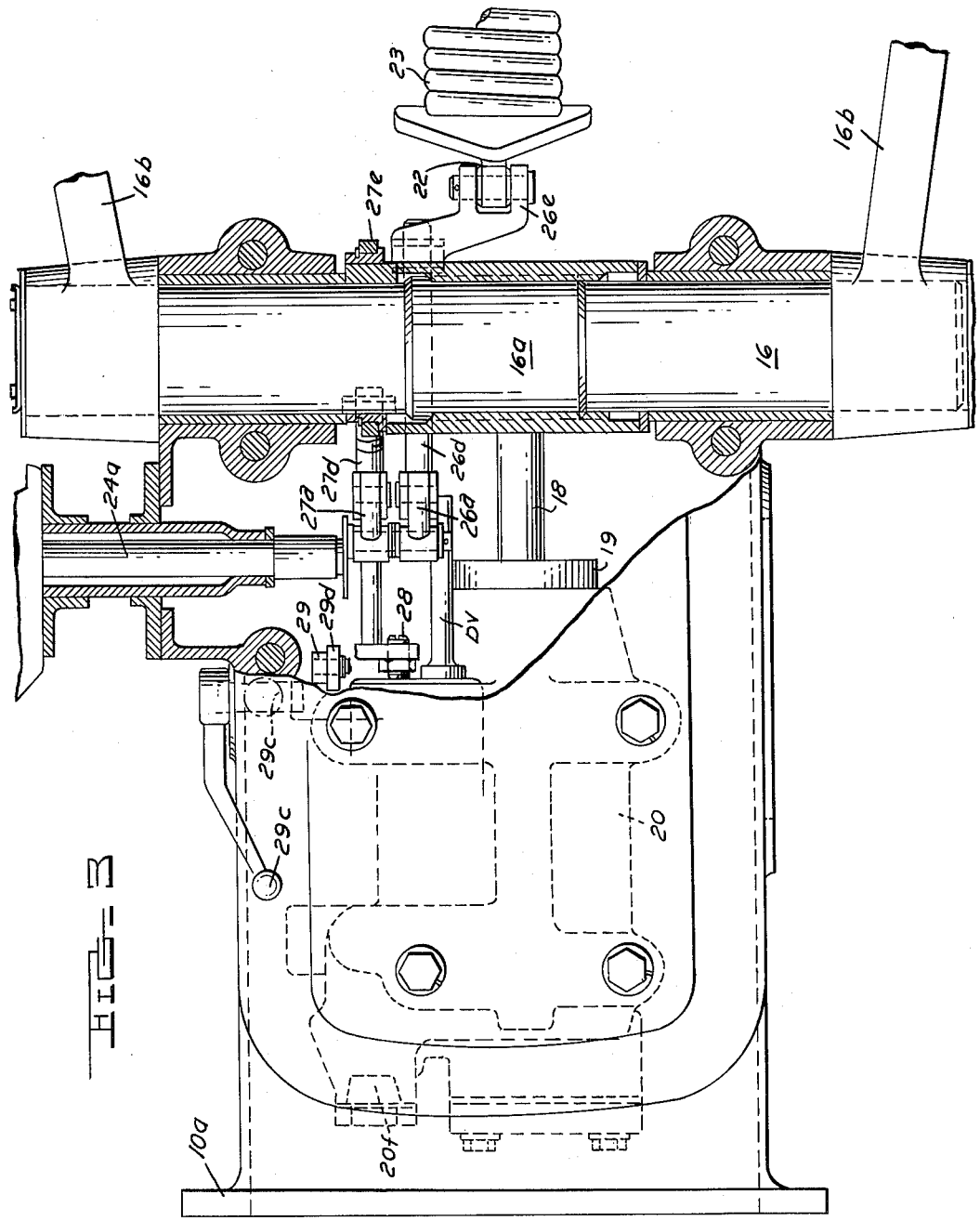

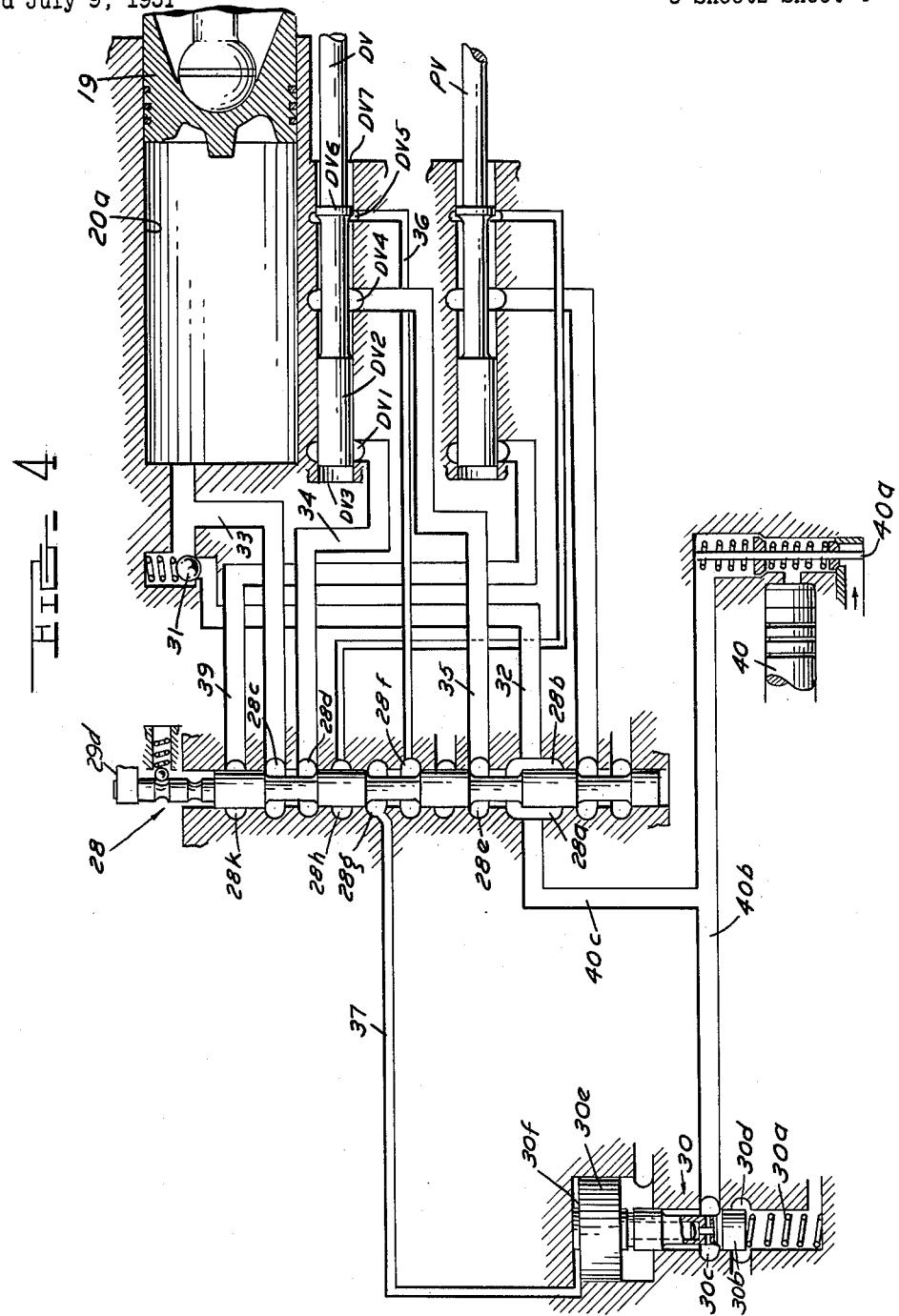

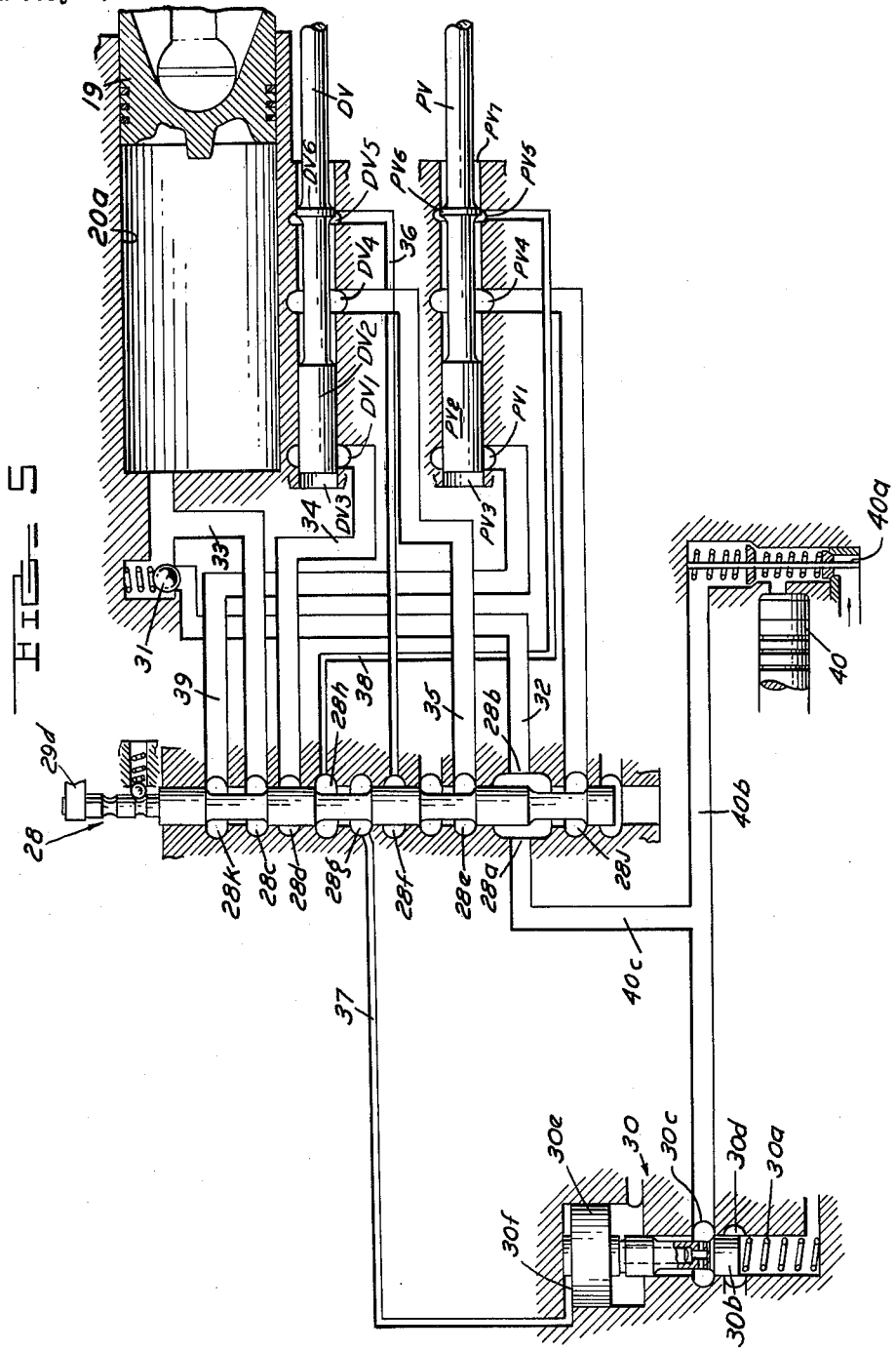

United States Patent Office 2,722,873
Patented Nov. 8, 1955

2,722,873

TRACTOR HYDRAULIC SYSTEM

Curt H. Garmager, Royal Oak, Mich., assignor, by mesne assignments, to Ford Motor Company, Dearborn, Mich., a corporation of Delaware Application July 9, 1951, Serial No. 235,880

7 Claims. (Cl. 97—46.07)

This invention relates to an improved hydraulic control system for tractors, and particularly to a hydraulic arrangement for controlling the angular position of a hydraulically actuated implement lifting rock shaft in response to a particular condition of operation of an implement connected to such rock shaft.

Several well-known types of tractors have heretofore incorporated hydraulically lifted hitch links for effecting the connection of an implement to the tractor. In the well-known Model 8N Ford tractor in particular, a control mechanism has been provided for the hydraulic ram which effects the lifting of the hitch links, which control is capable, at the selection of the operator, of controlling the vertical position of such hitch links, and hence the working depth of the implement carried by the hitch links, either as a function of the draft exerted by the implement on the tractor, or as a function of the relative height of the implement with respect to the tractor. These two types of controls have heretofore been commonly referred to as "constant draft control" and "implement position control." Under either of these control conditions, the operator manipulates a control lever to pre-set either the amount of draft desired or the height of the implement relative to the tractor, and thereafter, the control mechanism functions to raise or lower the hitch links to either maintain a substantially constant draft effect on the tractor corresponding to the pre-selected value, or to maintain the implement at a vertical position relative to the tractor substantially corresponding to the selected position.

This known system of hydraulic control was based fundamentally upon selective actuation of the inlet and exhaust valves of a hydraulic pump to produce varying pressures upon the hydraulic ram connected to the hitch links in response to the selected implement condition, be it constant draft or implement position. Such mechanism has been found to have several disadvantages. First, a relatively complicated mechanical linkage was required to effect the operation of the inlet and exhaust valve of the hydraulic pump in response to the controlling condition. It has been a matter of some difficulty to achieve proper adjustment of such linkage so as to provide optimum performance under both operating conditions. Secondly, and most important, the described arrangement has been somewhat sluggish in operation due to the fact that controlling the fluid input to the pump necessarily meant that the entire hydraulic system was not at all times filled with oil, and hence, when a control action was initiated calling for an increase of fluid pressure on the hydraulic ram, the pump would have to operate for a slight period to completely fill the system with fluid before being able to build up the required pressure to operate the ram.

Accordingly, it is an object of this invention to provide an improved hydraulic control system for the hydraulically lifted hitch links of a tractor, characterized by unusual simplicity and economy of construction, ease of adjustment, and most important, a control system that is readily interchangeable for the control mechanism already existing on many thousands of tractors now in use.

Another object of this invention is to provide an improved control system for the hydraulically actuated hitch links of a tractor which will selectively function to control the vertical position of such hitch links either as a function of the draft demand of an implement connected to the hitch links or as a function of the vertical position of the connected implement with respect to the tractor.

A particular object of this invention is to provide an improved apparatus for controlling hydraulically actuated hitch links of a tractor wherein the hydraulic pump is permitted to pump fluid continuously and the entire control system is at all times filled with hydraulic fluid so that any required control actions to maintain a pre-selected implement condition can be immediately initiated without any substantial time lag.

Still another object of this invention is to provide a control system for hydraulically actuated hitch links of a tractor which may be selectively controlled as a function of the draft demand of an implement connected to the hitch links, or of the vertical position of a connected implement, and wherein the selection of either one of the two types of control may be conveniently effected by manual operation of a two position selector type hydraulic valve.

Still another object of this invention is to provide a hydraulic control mechanism for tractors wherein all elements of the mechanism except the pump are mounted on a cover element of the main body casting of the tractor.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a longitudinal sectional view through the rear end body housing of a tractor of well-known make.

Figure 2 is a cross sectional view of the device of Figure 1 taken along the plane 2—2.

Figure 3 is a plan view of the device of Figure 1, with the casing partly broken away to show the arrangement of the interior elements.

Figure 4 is a schematic diagram of the hydraulic system showing the selector valve positioned to condition the system to function in response to variations in draft demand of a connected implement.

Figure 5 is a schematic diagram of the hydraulic system showing the selector valve positioned to produce operation of the system as a function of the implement position relative to the tractor.

Figure 6 is a partial cross sectional view taken along the plane 6—6 of Figure 1.

Figure 7 is a fragmentary detail cross sectional view taken along the plane 7—7 of Figure 1.

Figure 8 is a fragmentary detail cross sectional view taken along the plane 8—8 of Figure 1.

Figure 9 is a fragmentary detail view taken along the plane 9—9 of Figure 6.

As shown on the drawings:

Referring to Figure 1 of the drawings, there is shown in vertical section the rear end of the central body housing 10 of the well-known Ford tractor comprising an elongated hollow casting which is secured at its front end by a flange 10a to a mating flange provided on the rear end of transmission housing casting (not shown). Extending laterally from both sides of the rear portion of the body housing 10 are rear axle housings 11 (Figure 2). Extending centrally through the body housing 10 is the main drive shaft 12 which has its rear end journaled by suitable anti-friction bearings 12a which are in turn supported in an internal wall 10b of the housing 10. The rear end of drive shaft 12 carries a pinion 13 which meshes with the large ring gear (not shown) of the differential to drive the rear axle of the tractor in conventional fashion.

Below the main drive shaft 12 a power-take-off shaft 14 is journaled in the body housing 10 and extends rearwardly through body housing 10 and projects out of such housing through a suitable aperture 10c in which there is inserted the bearing bushing 15. Power-take-off shaft 14 is connected to the drive shaft 12 through a suitable clutch 14a which is in turn controlled through shift rod 14b by a manually operated lever (not shown) located conveniently adjacent to the operator's seat on the tractor. When such clutch is engaged, power-take-off shaft 14 is continuously driven so long as the tractor engine is turning the main drive shaft 12.

A hydraulic pump 40 of the well-known "scotch yoke" type is mounted in surrounding relationship to the power-take-off shaft 14 and the eccentric rotors 40a of such pump are secured to the power-take-off shaft and driven thereby.

At the top of the body housing 10, an implement controlling rock shaft 16 (Figure 3) is mounted having a shaft portion 16a suitably journaled in a cover housing 17 which is bolted to body housing 10 in overlying relationship to a large opening formed therein. At each lateral extremity of rock shaft 16, a pair of lifting crank arms 16b (Figure 3) are mounted and these arms are respectively connected in conventional fashion to a pair of laterally spaced trailing hitch links (not shown) which are respectively conventionally mounted to the rear axle housings 11. On the central portion of the rock shaft 16, a depending actuating arm 16c is rigidly mounted which terminates in a socket portion 16d. A connecting rod 18 has ball-shaped ends 18a respectively cooperating with socket 16d and a socket-shaped recess 19a formed in a ram piston 19 and the one ball end 18a is secured in a socket 16d by a pin 16e. Ram piston 19 cooperates with a cylinder bore 20a which is formed in the central portion of a combined valve and cylinder housing 20 mounted in depending relation to cover housing 17. Hence, the application of pressured fluid to cylinder bore 20a will produce a displacement of the ram 19 and in turn produce a lifting of any implement connected to the hitch links of the tractor.

At a top central portion of the rear end of the body housing 10, a pair of integrally formed, transversely spaced, upstanding lugs 10d are provided which mount a pin 10e upon which in turn is mounted a rocker member 21. Rocker 21 has a U-shaped upper portion 21a provided with a plurality of vertically spaced holes 21b therein which permit the selective mounting of the so-called top link or compression link between an implement and the tractor. As is well-known, this type of mounting of an implement to the tractor produces a compressive force in the top link whenever the implement is completely hooked up to the tractor and in engagement with the ground, and such compressive force is a function of the draft effort demanded by the implement from the tractor. A reference member is provided on the tractor which is shiftable in response to the variations in such compressive force and such reference member has commonly constituted a plunger 22 pivotally connected at one end to the rocker 21 by a pin 22a and having its other end projecting into the interior of cover housing 17 through an opening 17c provided in the rear portions of the cover housing 17. To measure the compressive force exerted on the rocker 21 by a connected implement, and to produce a displacement of plunger 22 proportional thereto, a draft reference or indicating spring 23 is provided which is mounted in surrounding relationship to the plunger 22 and is arranged to be compressed by the application of compressive forces to the rocker 21 through the implement top link.

Thus far, all of the described construction is substantially identical to that provided on the well-known Ford tractor. In the construction embodying this invention, the pump 40 is permitted to pump hydraulic fluid continuously so long as shaft 13 is driven, and the application of such hydraulic fluid to the ram 19 is controlled in an entirely different manner.

Before considering the hydraulic circuits and the schematic diagrams of Figures 4 and 5, it is believed desirable to point out several additional structural elements forming part of the control arrangement.

The cylinder and valve casting 20 is also provided with longitudinal bores 20b and 20c (Figures 2 and 6) both parallel to the main cylinder bore 20a in which are respectively mounted identical piston type control valves DV and PV. The hydraulic functions of these valves will be described in more detail later.

Also, on one lateral side of the cover housing 17, a manually operated control lever 24 (Figure 2) is mounted comprising a shaft portion 24a suitably journaled in the cover housing 17 and a lever arm portion 24b which terminates upwardly in a ball-like handle 24c at a point where it may be conveniently grasped by the hand of the tractor operator. A sector shaped stationary guide 25 is provided adjacent the control lever 24 and serves the usual purposes. Hence, manual shifting of the control lever arm 24b will produce angular displacements of the control lever shaft 24a.

Within the interior of cover housing 17, two separate servo type linkages 26 and 27 are provided which respectively interconnect control shaft 24a with the control valves DV and PV. Servo linkage 26 comprises a link 26a (Figure 1) eccentrically connected to control shaft 24a by an axially parallel pin 26b. Link 26a is in turn connected to one end of a neutralizing or control link 26c which has its other end pivotally connected to the control valve piston DV. The central portion of control link 26c is pivotally connected to a rod 26d which has an adjustable length connection to a connector member 26e which in turn is connected to the inwardly projecting end of the draft reference plunger 22 (Figure 1). Accordingly, the neutralizing link 26c is shifted to effect displacement of the control valve DV either in response to a displacement of the manual control lever 24 or a displacement of the draft reference plunger 22. Furthermore, at every position of the draft reference plunger 22, there will be a corresponding position of the manual control lever 24 at which the end of control link 26c and hence control valve DV will occupy the same neutral position. As will be brought out later, any displacement of the control valve DV from such neutral position produces a suitable hydraulic reaction so as to shift the vertical position of the connected implement to produce a displacement of draft reference plunger 22 in the proper direction to tend to return the control valve DV to its neutral position.

For reasons to be brought out in more detail later, the adjustable length connection between the rod 26d and the connector member 26e is also yieldable in one direction. Such yielding action is accomplished by having the end of rod 26d slidably insertable through connector member 26e and adjustably positioned with respect to connector member 26e by a pair of lock nuts 26g (Figure 1) secured to the threaded end of rod 26d. The opposite end of rod 26d is also threaded and adjustably mounts a second pair of lock nuts 26f which form a seat for a compression spring 26h (Figure 1) mounted in surrounding relationship on rod 26d and compressed between the lock nuts 26g and the forward face of the connector member 26e. Hence, whenever the rearward movement of the draft reference plunger 22 is limited, it is, nevertheless, possible for additional rearward movement of the central portion of control link 26c to occur through compression of the spring 26h. Control link 26c is positioned so that the ram 19 engages a stop 26j on such link near the end of the lifting stroke of the ram.

The reason for the resilient one way connection between the rod 26d and the connector member 26e will now be pointed out. Once the implement is raised from the ground by the raising movement of the ram 19 and the associated linkage, there will be no draft reaction force exerted upon the draft reference plunger 22. The draft reference or indicating spring 23 will therefore move the draft reference plunger 22 rearwardly to its extreme position where a shoulder 22c bottoms on the cover housing 17. If a rigid connection were provided between the control link 26c and the draft reference plunger 22, the control valve DV could only be returned to its neutral position by the engagement of the ram 19 with link 26c through an attendant displacement of the manual control lever 24. The resilient one way connection provided between spring 26h permits the ram 19 to return the control valve DV to its neutral position without disturbing the setting of the manual control lever 24.

The cylinder and valve housing 20 also incorporates a third longitudinal valve bore 20e (Figures 1 and 6) in which is mounted a piston type selector valve 28. As will be brought out later, the selector valve 28 has two operative positions in which it respectively connects either control valve DV or PV into the hydraulic circuit controlling the supply of pressure fluid to the ram cylinder bore 20a. The shifting of the selector valve element 28 is accomplished by a connector 29d (Figure 1) which extends from such selector valve element to a crank arm 29 mounted on a shaft 29a which projects through cover housing 17 and on its projecting end mounts a selector handle 29c.

Cylinder and valve housing 20 incorporates an additional longitudinal bore 20d (Figure 6) which is utilized to mount a piston actuated by-pass valve 30. The construction and operation of the by-pass valve 30 will be described in more detail in conjunction with later discussion of the schematic hydraulic diagrams. Lastly, it should be mentioned that a suitable bore 20f (Figure 8) is provided in the cylinder and valve housing 20 to mount a check valve 31 which is connected directly into the fluid supply line 32 to the ram cylinder 20 and functions to prevent reverse flow of fluid from the ram cylinder 20.

Referring now to the schematic hydraulic diagrams of Figures 4 and 5, the fluid connections incorporated between the various elements heretofore mentioned and the specific valving functions of the various valves mentioned will be explained. In the schematic diagram of Figure 4, the selector valve 28 is shown in its position corresponding to connecting of the control valve DV in the hydraulic circuit, or in other words, the system is conditioned to function in response to variations in draft demands of a connected implement. It should be mentioned that the entire interior of the body housing 10 functions as a sump for the hydraulic mechanism and the excess fluid not actually contained within the valves and the cylinder of the system is stored in the bottom of body housing 10. The inlet passage 40a for the pump 40 is located so as to be in communication with the accumulated fluid in the bottom of body housing 10. Similarly, all open fluid ports in the schematic diagrams constitute connections to the sump.

As was previously indicated, the pump 40 is arranged to continuously pump fluid from the sump to the pump discharge line 40b. When the control valve DV is in its neutral position, meaning that neither the manual control lever 24 nor the draft reference plunger 22 are calling for any change in position of the ram 19, substantially the entire pressure output of the pump 40 is by-passed to the sump by the by-pass valve 30. The by-pass valve 30 is constructed along the lines of an ordinary pressure relief valve, but having a relatively stiff biasing spring 30a and an actuating piston 30e having a large area face 30f operatively connected to the by-pass valve 30 which piston functions in opposition to spring 30a to effect the change-over of the valve 30 from a low pressure relief valve to a high pressure relief valve in a manner that will be described in more detail later. Flow of fluid through valve 30 is determined by the position of a piston portion 30b relative to inlet ports 30c and a sump port 30d.

The pressure discharge conduit 40b is connected by a conduit 40c through ports 28a and 28b of selector valve 28 to a conduit 32 which is in direct communication with the ram cylinder bore 20a. The check valve 31 is mounted in conduit 32 and, as mentioned previously, functions in the usual manner to prevent reverse flow from the ram cylinder. A ram cylinder discharge conduit 33 is connected to conduit 32 intermediate ram cylinder bore 20a and check valve 31. This conduit connects through ports 28c and 28d of selector valve 28 with a conduit 34 which connects with a port DV1 of the draft control valve DV. The discharge of fluid from ram cylinder bore 20a through conduits 33 and 34 is prevented by a piston portion DV2 of draft control valve DV when such control valve is in its neutral position or is shifted in a direction corresponding to a requirement for increased pressure to be applied to the ram cylinder bore 20a. Upon movement of the draft control valve DV from its neutral position in a direction (to the right as viewed in Figure 4) corresponding to a requirement for less fluid pressure in the ram cylinder bore 20a, the piston portion DV2 uncovers an outlet port DV3 communicating with the sump and, hence, fluid is permitted to drain from the ram cylinder bore 20a back to the sump so long as the draft control valve DV is thus displaced from its neutral position. Thus, in effect, ports DV1 and DV3 and piston portion DV2 function as an auxiliary valve movable concurrently with control valve DV.

The pressure conduit 40c is also connectable through the selector valve 28 with a port 28e which in turn connects with a conduit 35 which leads to a port DV4 in draft control valve DV. An adjacent port DV5 is provided on draft control valve DV and, in the neutral position of draft control valve DV, a piston portion DV6 of such valve permits fluid flow between ports DV4 and DV5 within the valve. The port DV5 is connected to a conduit 36, which connects through ports 28f and 28g of selector valve 28 with a conduit 37 which is in fluid communication with the large face 30f of piston portion 30e of the by-pass valve 30. So long as the draft control valve DV remains in its neutral position or it is shifted from such neutral position only in the direction (to the right as viewed in Figure 4) requiring less fluid pressure in the ram cylinder 20a, the minimum pressure in the hydraulic system will be applied to the large face of the large piston portion 30e and such valve will function as a low pressure relief valve. However, when the draft control valve DV is shifted in a direction (to the left as viewed in Figure 4) corresponding to a requirement for increased pressure in the ram cylinder bore 20a, piston portion DV6 interrupts flow communication between ports DV4 and DV5 and connects port DV5 to the sump through a port DV7. This has the effect of reducing the pressure applied to the large face 30f of the piston portion 30e of relief valve 30 and, hence, the relief valve closes under the influence of the relatively stiff spring 30a until the pressure in the system approaches the desired maximum working value which is usually on the order of 1,000 to 2,000 pounds per square inch. At the desired maximum pressure, as determined by the stiffness of the spring 30a, the piston portion 30b of relief valve 30 will begin to function as a high pressure relief valve to by-pass fluid to the sump in the quantities necessary to maintain the desired working pressure. It should be particularly noted that the increase in pressure in the entire system from the minimum value to the working value occurs almost instantaneously since at all times the entire system is filled with oil. There is, therefore, no delay encountered in building up the pressure to a working value since the pump is continually pumping fluid at its full capacity and there are no voids in the system that have to be filled by fluid before the pressure can build up. It should be understood that all of the conduits heretofore mentioned may be conveniently integrally incorporated in the valve and cylinder housing 29, except for the conduits connecting pump 40 with such housing.

As was previously mentioned, upon the extreme displacement of the ram 19 in the direction corresponding to maximum lifting of the connected implement, a stop 26j provided on the control link 26c is contacted by the rear end of ram 19 so as to move the control valve DV to its neutral position irrespective of the position of the control plunger 22 at the time. Or, in other words, when the ram 19 reaches its extreme position of maximum lifting, the servo linkage 26 is automatically operated to position the control valve DV in neutral and thus to interrupt any further lifting movement of the ram 19.

The foregoing description of the operation of the hydraulic system has been entirely in conjunction with the arrangement of the system illustrated in Figure 4 where the selector valve 28 is positioned so as to connect the draft control valve DV into the hydraulic system as the primary controlling agency while the position control valve PV is inoperative in the hydraulic system. Draft control valve DV is, of course, shifted in either direction from its neutral position according to the relationship of the draft demands of the connected implement on the tractor as compared with a selected setting of the manual control lever 24. As already pointed out, whenever the draft demand of a connected implement corresponds to a particular setting of a manual control lever 24, the servo linkage 26 interconnecting the draft reference plunger 22, the manual control lever shaft 24a and the control valve DV, will effect the positioning of the control valve DV in its neutral position which maintains the hydraulic system in the minimum pressure condition of operation. Hence, for such operating conditions, the manual control lever 24 in effect functions as a draft selector lever.

The servo linkage 27 connecting the manual control shaft 24a with the position control valve PV is similar to the servo linkage 26, with the exception that the height of a connected implement relative to the tractor, as indicated by the angular position of rock shaft 16, is employed as the reference element. Thus the control or neutralizing link 27c of such servo linkage has its medial portion pivotally connected by a threaded plunger 27d and lock nuts (not shown) to an eccentric ring 27e (Figure 3) which is mounted upon the implement lifting rock shaft 16. One end of control link 27c is pivotally connected to manual control shaft 24a by an eccentrically mounted link 27a. Accordingly, for every angular position of the manual control lever 24, there will be an angular position of the implement lifting rock shaft 16 at which the one end of control link 27c, and hence the control valve PV, will be maintained in the same neutral position. Ring 27e thus functions as a reference element indicating implement position with respect to the tractor.

Referring now to the schematic diagram of Figure 5, the selector valve 28 is there shown in the position which produces operation of the system under the control of the position control valve PV while the draft control valve DV is isolated from the fluid system. The operation of the hydraulic system under control of position valve PV is identical to the described operation under the control of the draft control valve DV. So long as the position control valve PV remains in its neutral position, as determined by the servo linkage 27 interconnecting the implement lifting rock shaft 16 and the manual control lever shaft 24a, the by-pass valve 30 is maintained in its low pressure relief valve condition of operation, i. e., a minimum pressure is maintained in the entire system and such minimum pressure is applied to the large face 30f of the piston element 30e of by-pass valve 30. Upon a shifting of position control valve PV in a direction (to the left as viewed in Figure 5) corresponding to a requirement for increased fluid pressure in the ram cylinder bore 20a, or to the left as viewed in Figure 5, the pressure on the large face of the piston element 30e is dumped to the sump through conduit 37, selector valve ports 28g and 28h, conduit 38 and ports PV5 and PV7 of the position control valve PV. This effects the conversion of by-pass valve 30 to its high pressure relief valve condition and the fluid pressure in the system immediately builds up to a working value and is supplied to ram cylinder bore 20a through conduit 40c, ports 28a and 28b of selector valve 28, conduit 32 and check valve 31. When the ram 19 effects sufficient movement of the implement lifting rock shaft 16 to correspond to the setting of the manual control lever 24, the position control valve PV is returned to its neutral position, as shown in Figure 5, by the servo linkage 27 and the piston portion PV6 of position control valve PV interrupts the fluid flow between port PV5 and PV7 and places port PV5 in communication with port PV4 which is connected to the hydraulic pressure conduit 40c through ports 28j of selector valve 28. This connection applies pressure to the large face 30f of the piston element 30e of the by-pass valve 30 and effects the conversion of such valve to its low pressure relief valve condition, so that the pressure in the entire system again returns to the minimum value.

Upon a shifting of the position control valve PV from its neutral position in a direction corresponding to a requirement for less fluid pressure in ram cylinder bore 20a, or toward the right as viewed in Figure 5, there is no effect upon the by-pass valve 30 and the fluid system remains in its minimum pressure condition of operation. An exhaust passage for fluid from ram cylinder bore 20a is, however, established through conduit 33, ports 28c and 28k of selector valve 28, conduit 39 and ports PV1 and PV3 of position control valve PV. Such discharge of fluid from ram cylinder bore 20a permits movement of the ram 19 in a lowering direction until the angular position of the implement lifting rock shaft 16 corresponds to the particular setting of manual control lever 24, whereupon the position control valve PV is again returned to its neutral position, as shown in Figure 5, and further distribution of fluid from the ram cylinder bore 20a is interrupted by the piston portion PV2 of position control valve PV blocking off port PV1. Thus the piston portion PV2 and ports PV1 and PV3 in effect function as an auxiliary valve operating concurrently with position control valve PV and under such conditions, the manual control lever functions as an implement position selector lever.

From the foregoing description, it is apparent that this invention provides an unusually simple, yet extremely effective, hydraulic and mechanical arrangement for selectively controlling the angular position of an implement lifting rock shaft on a tractor either as a function of the draft effort exerted upon the tractor by a connected implement, or as a function of the height of such implement relative to the tractor as measured by the angular position of the implement lifting rock shaft. The selection of the particular operating condition to which the hydraulic mechanism will respond is conveniently accomplished by the manual shifting of the selector valve 28 from one to the other of its two positions.

Furthermore, the initial calibration of the entire mechanism and subsequent adjustment to compensate for wear of the mechanical components can be effected in an unusually expedient manner, simply by adjusting the effective length of the connections between the control valves DV and PV and their respective servo linkages. Thus the hydraulic neutral position of either of the control valves DV or PV can be conveniently indicated by the formation of a ring mark on the piston portion of such valves which aligns with the face of the valve and cylinder housing 20 when such valves are in their neutral positions. The proper correlation between the manual control lever 24 and the draft reference plunger 22 may then be conveniently effected merely by adusting the position of the lock nuts 26f and 26g on the plunger 26d. Similarly, the proper correlation of the position of the manual control lever 24 with the angular position of the implement lifting rock shaft 16 may be effected simply by adusting the position of the lock nuts (not shown) on the connecting plunger 27d. Hence, accurate adustment of the entire hydraulic mechanism may be effected by an unskilled operator without special tools or gages, which is a most desirable characteristic for any machinery utilized under farm conditions.

It will, of course, be understood that many details of construction may be varied through a wide range without departing from the principles of this invention and it is, therefore, not the purpose to limit the patent granted hereon otherwise than necessitated by the scope of the appended claims.

I claim:
1. For use with tractors having a liftable implement hitch link, ram means for lifting said hitch link and hydraulic pump means for supplying pressured fluid to said rams; the improvements comprising a draft reference element shiftable in response to variations in draft effort exerted on the tractor by a connected implement; an implement position reference element shiftable in response to movement of said ram means; a first control valve having a first shiftable member; a second control valve having a second shiftable member; selector valve means for selectively connecting either said first control valve or said second control valve in the fluid circuit of said hydraulic pump means; a manually shiftable control device; a first servo linkage interconnecting said manually shiftable control device, said implement position reference element and said first shiftable member of said first control valve; and a second servo linkage interconnecting said manually shiftable control device, said draft reference element and said second shiftable member of said second control valve; whereby said manually shiftable control device determines either the draft effort to be exerted on the tractor or the implement position relative to the tractor according to the setting of said selector valve means.

2. The combination defined in claim 1 wherein said first and second control valves are identical.

3. A hydraulic control system for tractors having a hydraulic pump running constantly during tractor operation and an implement lifting hydraulic ram, comprising a first control link movable in either direction from a neutral position in response to deviations of implement draft from a pre-selected value, and a second control link movable in either direction from a neutral position in response to deviations of the implement height from a pre-selected value relative to the tractor, a pair of identical control valves respectively controlled by said control links, a regulating valve connected between the output and input sides of said pump and having a shiftable valve element normally positioned to by-pass substantially all fluid pressured by said pump and thereby maintain a minimum fluid pressure in said system, a piston element operatively connected to said shiftable valve element for moving same, and a two position, manual selector valve constructed and arranged to selectively interconnect the output side of said pump and said piston element through one or the other of said regulating valves, whereby said regulating valve is selectively controlled by either said first control link or said second control link.

4. The combination defined in claim 3 plus a pair of auxiliary valves each connected to the input side of said pump, and respectively operated concurrently with said control valves, a discharge conduit from said ram, and additional valve means on said selector valve for selectively connecting said ram discharge conduit to either one or the other of said auxiliary valves.

5. A hydraulic control system for tractors having a hydraulic pump running constantly during tractor operation and an implement lifting hydraulic ram, comprising a first control link movable in either direction from a neutral position in response to deviations of implement draft from a pre-selected value, a second control link movable in either direction from a neutral position in response to deviations of the implement height from a pre-selected value relative to the tractor, a pair of identical control valves respectively controlled by said control links, means including a fluid pressure control device for connecting said ram to the output side of said pump, and a two position selector valve constructed and arranged to selectively connect said fluid pressure control device for actuation by one or the other of said control valves.

6. The combination defined in claim 5 plus a pair of auxiliary valves each connected to the input side of said pump, and respectively operated concurrently with said control valves, a discharge conduit from said ram, and additional valve means on said selector valve for selectively connecting said ram discharge conduit to either one or the other of said auxiliary valves.

7. For use with a tractor having an open top housing adapted to contain hydraulic fluid and a pump connected to pressure such fluid; a hydraulic implement lifting device comprising a cover for said open top, an implement lifting rock shaft journaled in said cover, a shiftable draft reference element projecting through said cover and adapted for connection to an implement, a position reference element connected to said rock shaft, a unitary casting secured to said cover in depending relationship and defining a cylinder bore and a plurality of valve bores, a ram in said cylinder bore operatively connected to said rock shaft, a first control valve in one of said valve bores connected to said draft reference element, a second control valve in a second one of said valve bores connected to said position reference element, a two position selector valve in a third one of said valve bores, and fluid conduit means interconnecting said pump, said cylinder bore and said valve bores, whereby fluid pressure is applied to said ram selectively as a function of said draft reference element or said position reference element according to the position of said selector valve.

References Cited in the file of this patent
UNITED STATES PATENTS

| | | |
|---|---|---|
| Re. 22,642 | Ferguson | May 15, 1945 |
| 2,118,180 | Ferguson | May 24, 1938 |
| 2,118,181 | Ferguson | May 24, 1938 |
| 2,221,459 | Sassen | Nov. 12, 1940 |
| 2,262,126 | Whittles | Nov. 11, 1941 |
| 2,409,510 | Mott | Oct. 15, 1946 |
| 2,414,114 | Martin | Jan. 14, 1947 |
| 2,521,503 | Clark | Sept. 5, 1950 |
| 2,611,306 | Strehlow et al. | Sept. 23, 1952 |
| 2,611,307 | Strehlow et al. | Sept. 23, 1952 |

FOREIGN PATENTS

| | | |
|---|---|---|
| 619,090 | Great Britain | Mar. 3, 1949 |